Feb. 16, 1932.　　　I. H. ATHEY　　　1,844,938
VEHICLE
Filed Oct. 1, 1928　　　6 Sheets-Sheet 1

Inventor:
Isaac H. Athey
By Williams, Bradbury, McCaleb & Hinkle
Attys.

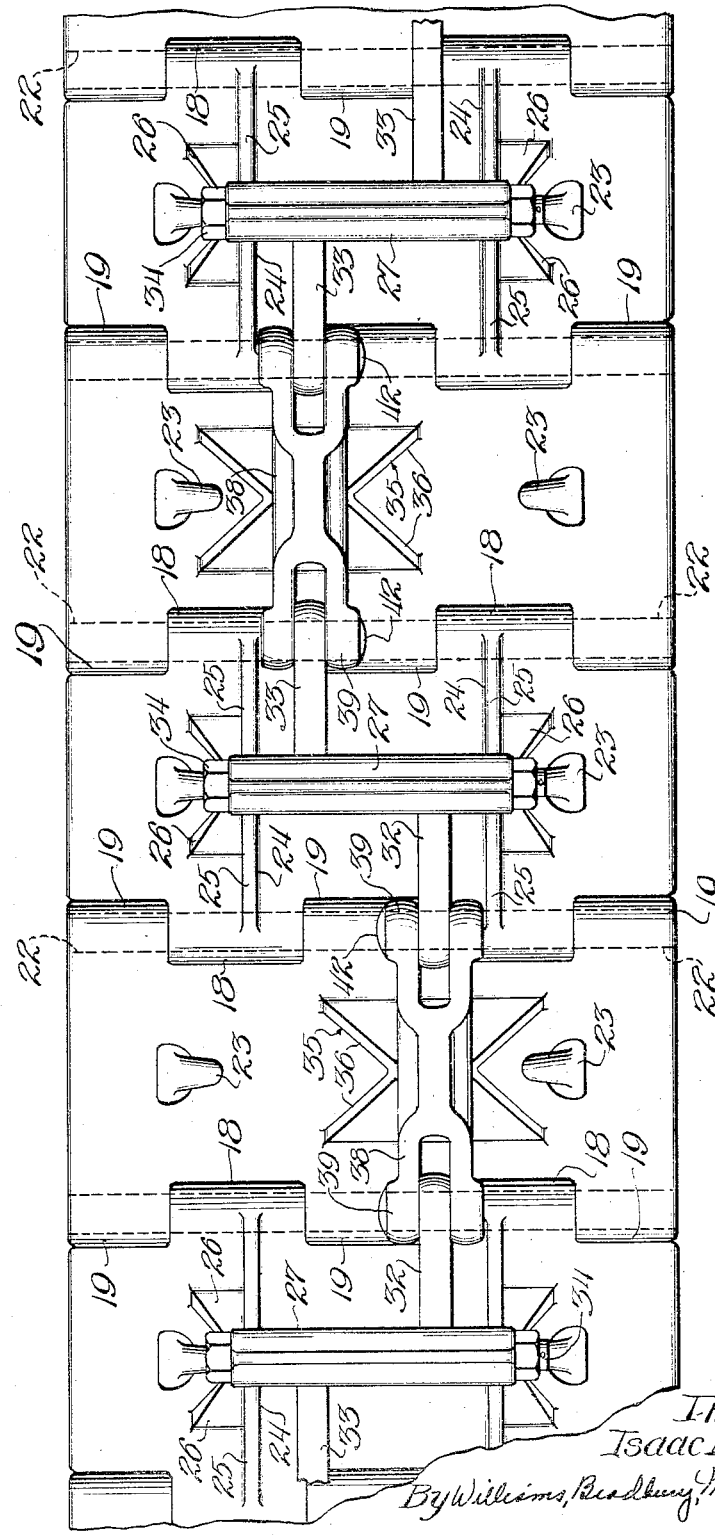

Feb. 16, 1932.  I. H. ATHEY  1,844,938
VEHICLE
Filed Oct. 1, 1928  6 Sheets-Sheet 3
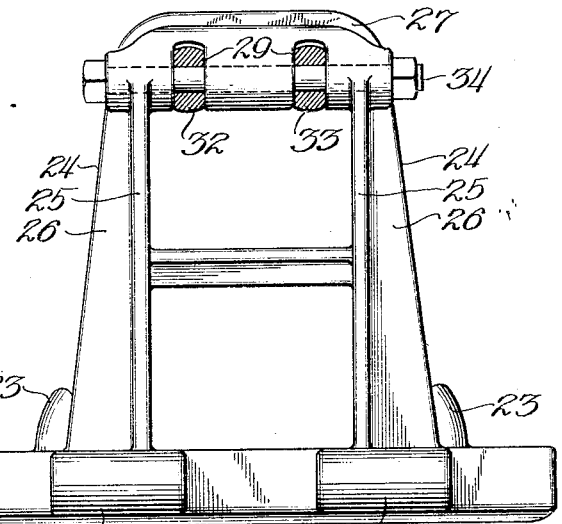
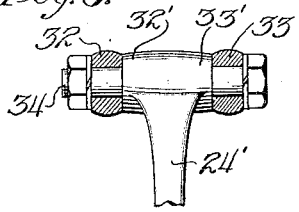
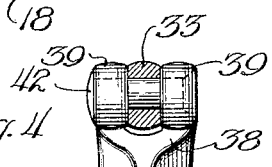
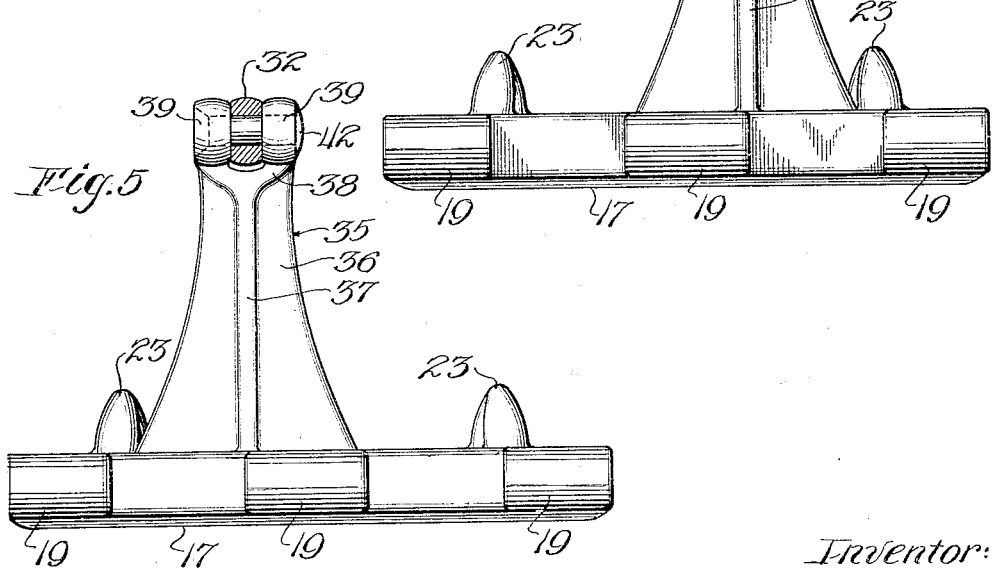
Inventor:
Isaac H. Athey
By Williams, Bradbury, McCaleb & Hinkle
Attys.

Feb. 16, 1932.  I. H. ATHEY  1,844,938
VEHICLE
Filed Oct. 1, 1928  6 Sheets-Sheet 4

Inventor:
Isaac H. Athey

Feb. 16, 1932.  I. H. ATHEY  1,844,938
VEHICLE
Filed Oct. 1, 1928   6 Sheets-Sheet 5

Inventor:
Isaac H. Athey
By Williams, Bradbury, McCaleb & Hinkle
Attys.

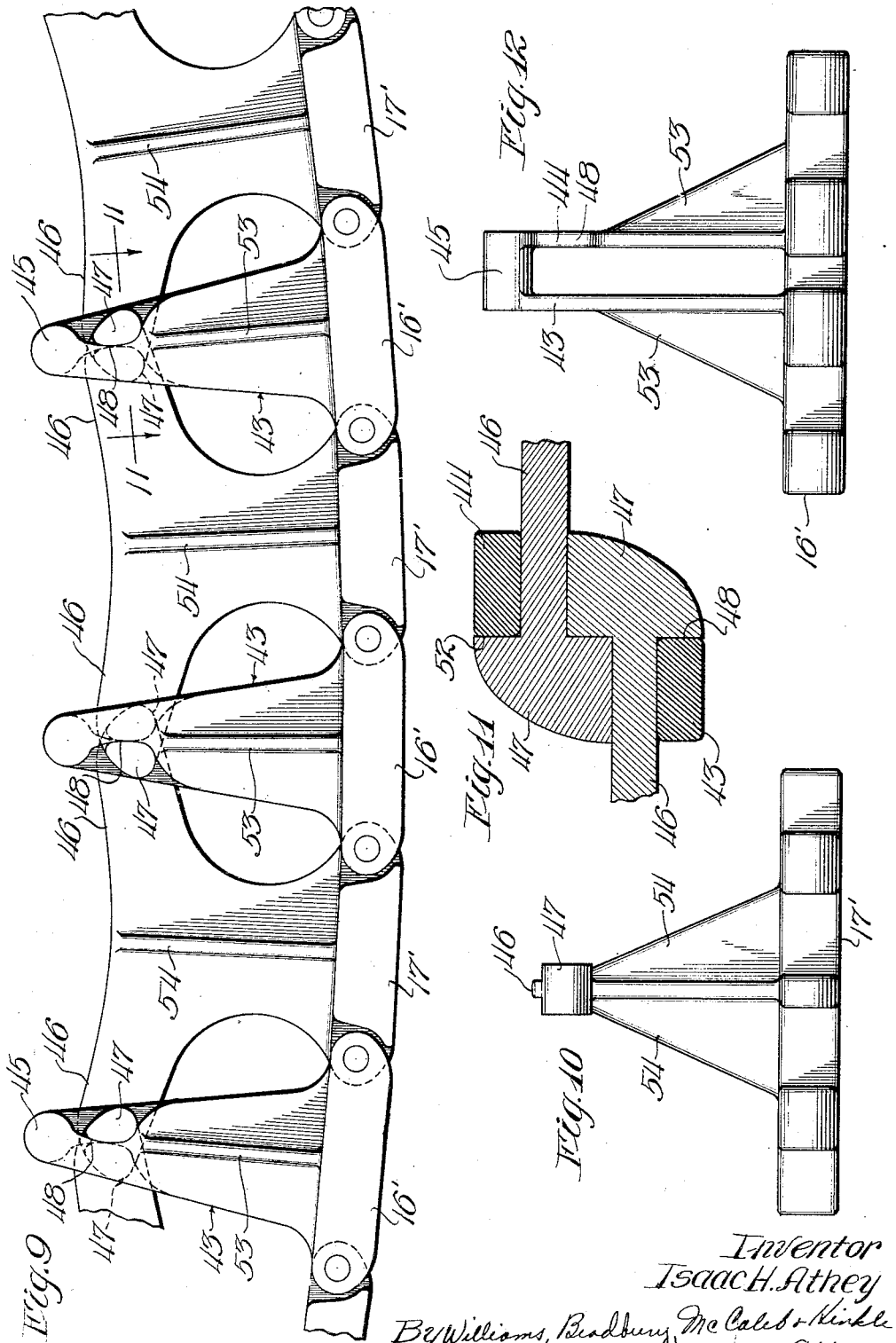

Patented Feb. 16, 1932

1,844,938

UNITED STATES PATENT OFFICE

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS

VEHICLE

Application filed October 1, 1928. Serial No. 309,414.

My invention relates to improvements in vehicles and is particularly concerned with improvements in the running gear of that type of vehicle in which the load supporting wheels run upon an endless track chain which passes around the load supporting wheels.

An object of my invention is to provide an improved running gear for a vehicle.

A further object is to provide a running gear for a vehicle having an endless chain track upon which the wheels of the vehicle are supported, the portion of the endless track between the wheels forming a supporting area for the vehicle.

A further object is to provide an endless track formed by a plurality of interconnected tread members carrying truss arms to form a rigid support between the wheels of the vehicle, the truss arms of alternate tread members being of a different construction to improve the collapsibility of the truss arms as the endless chain passes around the wheels of the vehicle.

A further object is to provide an endless track provided with tread members carrying truss arms which will insure a rigid supporting area in the track between the wheels without interfering with the collapsibility of the truss as the chain is folded about a relatively small wheel.

Other objects and advantages of the invention will appear as the description proceeds.

In the drawings

Fig. 2 is an enlarged inner plan view of a portion of the endless track chain;

Fig. 3 is generally an end elevation of a shoe forming a part of the track chain with parts broken away in section;

Fig. 4 is generally an end elevation, with parts broken away in section, of a shoe adapted to cooperate with the shoe of Fig. 3 to form an endless track chain;

Fig. 5 is a corresponding view of a shoe similar to the shoe shown in Fig. 4 adapted to cooperate with the shoe shown in Fig. 3 to form an endless track chain;

Fig. 6 is a fragmentary view of a modified form of the shoe shown in Fig. 3;

Fig. 9 is a side elevation of the apparatus shown in Fig. 8;

Fig. 10 is an end elevation of a shoe used in the modified form of the apparatus;

Fig. 11 is a horizontal section taken on lines 11—11 of Fig. 9; and

Fig. 12 is an end elevation of a shoe used in the modified form of the invention.

Figure 1:
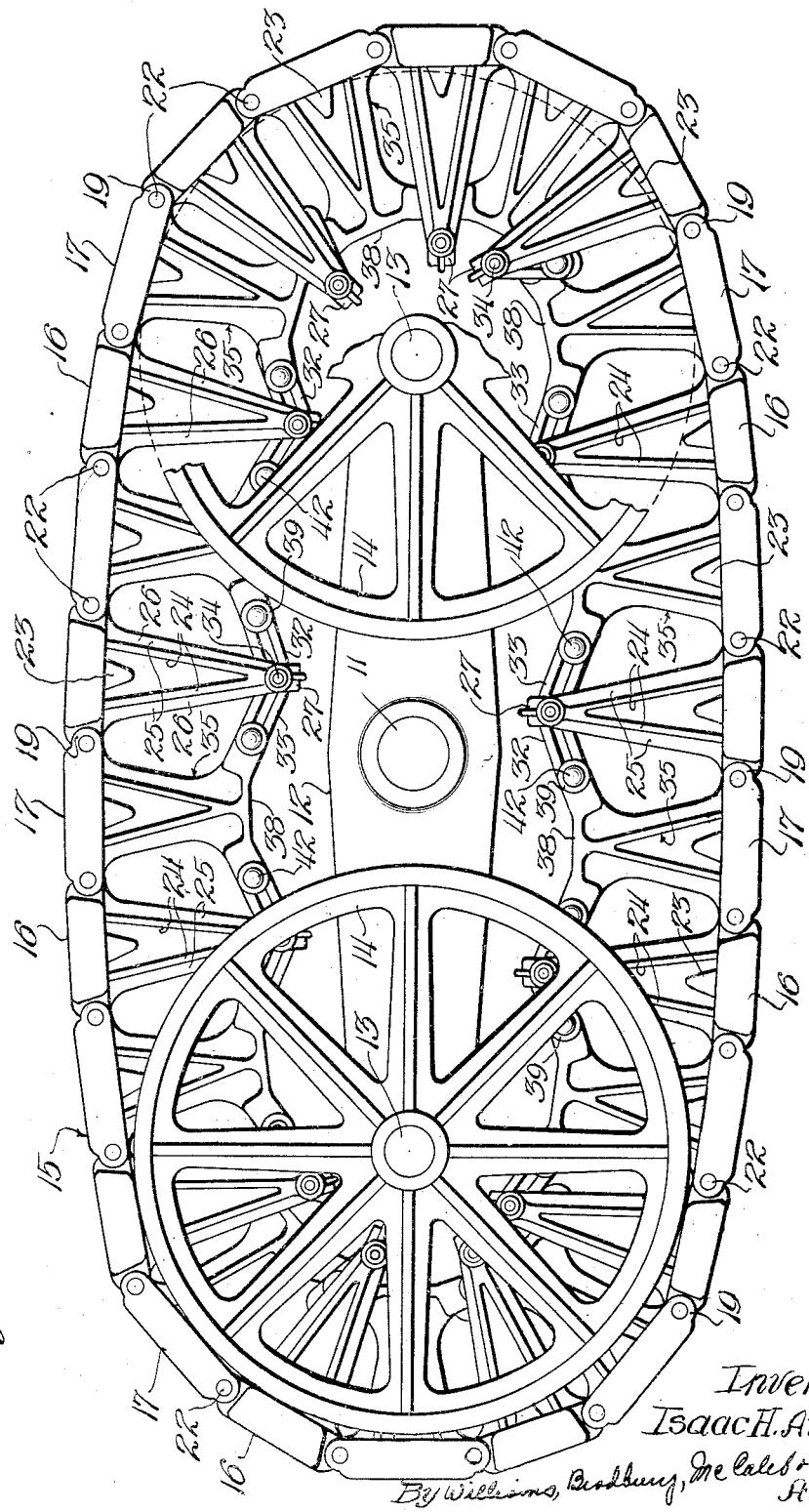
Fig. 1 is a side elevation of a running gear of a vehicle embodying my improved construction, portions thereof being broken away to show the truss arms folded around a wheel.

Referring to the drawings, in which the same reference characters represent similar parts in the several views, an axle 11 is shown upon which the vehicle may be mounted in any well known manner. A beam 12 is pivotally mounted at each end of the axle which passes through the center of the beam. Journaled in each end of the arms of the beam is an axle 13 which projects outwardly from the beam at each end, supporting at each end a wheel 14.

An endless chain 15 passes around the wheels and forms a track upon which the wheels are supported. Chain 15 comprises shoes 16 having intervening shoes 17. Shoes 16 have at each end lugs 18 and shoes 17 are provided at each end with lugs 19 which are arranged to dovetail with lugs 18 of shoe 16. A pintle 22 passes through the dovetailed lugs 18 and 19 forming a hinged joint between the shoes. Shoes 16 and 17 are provided with inwardly projecting lugs 23 which form guides for wheels 14 and serve to maintain the wheels upon the track formed along the sides of the shoes.

Extending inwardly from each of the shoes 16 are two truss arms 24 having longitudinal abutments 25 and lateral abutments 26. The lateral abutments of the truss arms are located on the outside of abutments 25, leaving a rectangular space between the truss arms, which is enclosed at the inner end by a cross piece 27, and at the outer end by the tread member of the shoe. Cross piece 27 has on its under side a plurality of slots 29 adapted to receive links 32 and 33, which are retained therein by a bolt 34 serving as a bearing for links 32 and 33, the bearing for link 32 being thus in transverse alinement with the bearing for link 33. Shoes 17 have a truss arm 35 extending inwardly from the tread member of the shoe which is of a different construction than the truss arms of shoes 16. Truss arm 35 has lateral abutments 36 and longitudinal abutments 37 which taper inwardly and the arm is surmounted by a T-shaped head 38 extending longitudinally and provided at each end with a bearing 39 located in vertical alinement with a pintle 22. The truss arms of alternate shoes 17 are alternately offset so that the bearings 39 of one shoe 17 are in alinement with links 33 and bearings 39 of the opposite shoe 17 are in alinement with the link 32. Links 32 and 33 are provided with longitudinal slots in which bolts 42 of bearings 39 are slidably mounted.

The shoes upon which wheels 14 rest will tend to be moved downwardly into contact with the ground by the weight and load of the vehicle. The shoes between the point of support of the wheels, on account of the construction and interconnection of the truss arms, are prevented from moving inwardly and thus form a rigid support to increase the load supporting area of the chain. The truss arms are so arranged that the contour of the portion of the chain in contact with the ground or other supporting surface is slightly convex. As the chain passes around a wheel, truss arms 24 and 35 will move toward each other pivoting about pintle 22 so that the angle between them will decrease. As the arms move toward each other, bolts 42 will slide in the longitudinal slots in the links connecting truss arms 24 and 35. The bearings 39 are located directly vertically above the pintles 22 and the radial distance of the bearing 39 from pintle 22 is such that the arc of the movement of bearing 39 falls within the pivotal connection of the link on truss arm 24. The bearing 39 may thus pass through the rectangular space between truss arms 24 until the cross piece between truss arms 24 is over the T-shaped portion of truss arm 35. This construction allows alternate truss arms 24 to come into close proximity to each other as the chain passes around the wheel and the chain has practically the same collapsibility as it would have if truss arms 35 were omitted.

In Fig. 6 a modified form of shoe 16 is shown in which a single truss arm 24' provides transversely spaced bearings 32' and 33'. In operation this form of the apparatus is identical with that just described.

Figure 7:
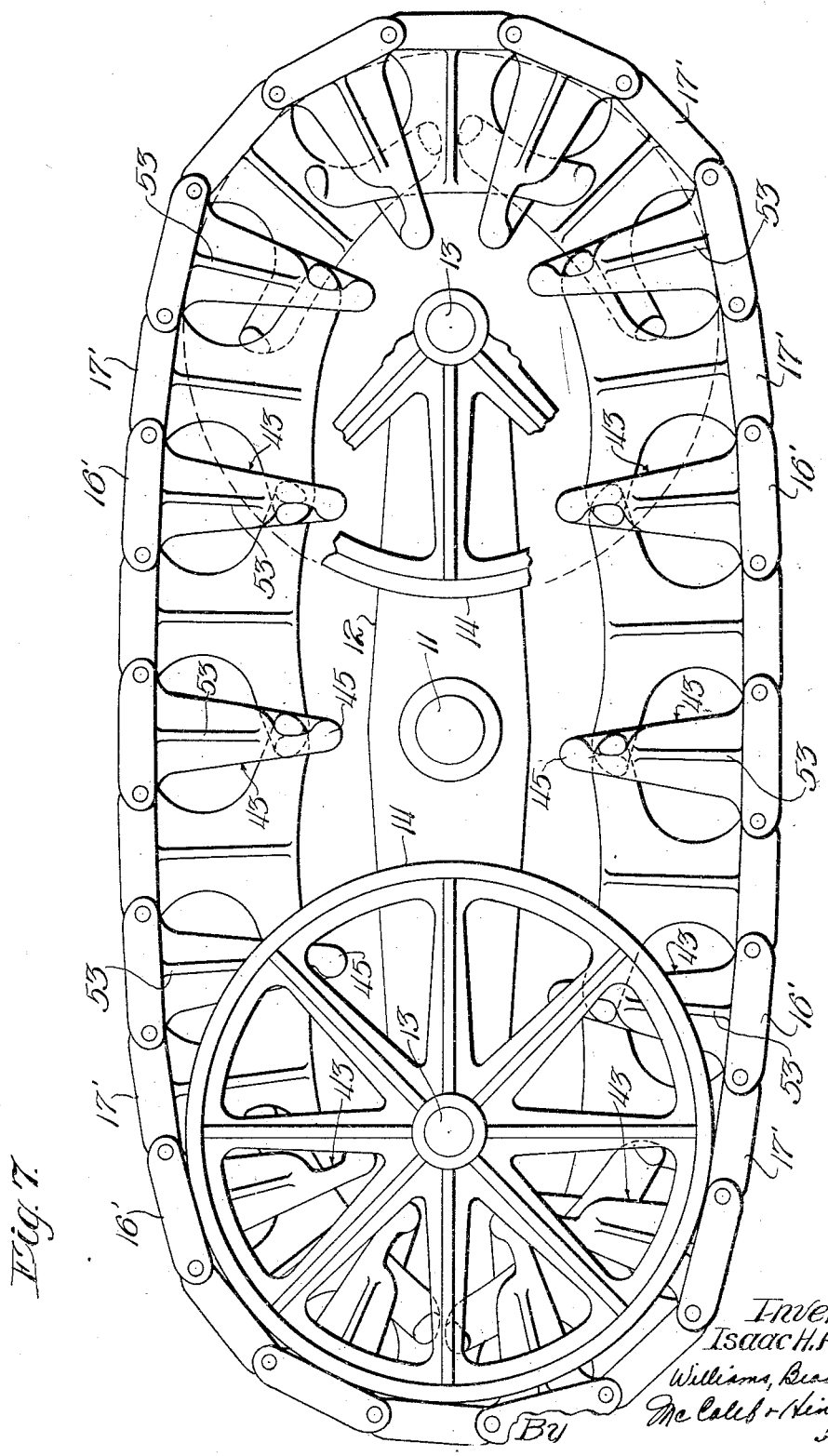
Fig. 7 is a side elevation, with parts broken away to show other parts of a modified form of running gear for a vehicle.
Figure 8:
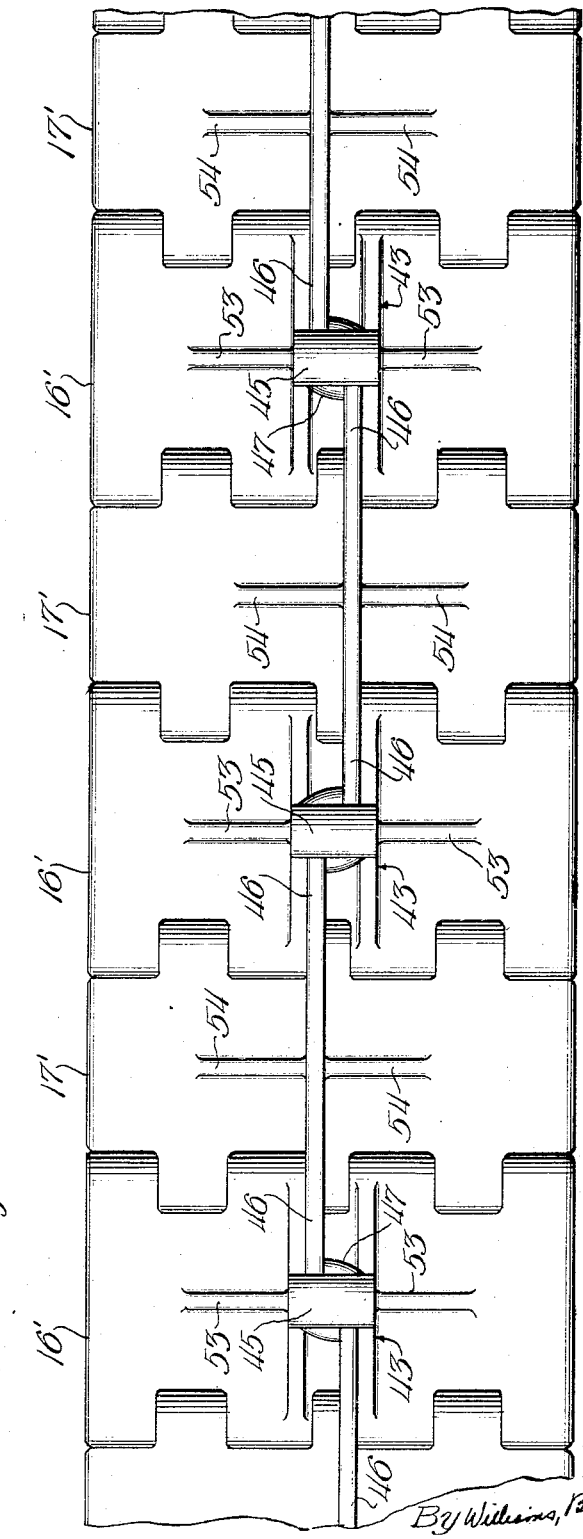
Fig. 8 is an inner plan view of a portion of the endless track chain used in the modified form of apparatus.

In the modified form of the invention shown in Figs. 7 to 12, the links between adjacent truss members have been omitted. Shoes 16' are each provided with inwardly extending truss arms 43 and 44 which are bridged by a cross piece 45 and have a rectangular space therebetween. Truss arms 43 and 44 are provided with lateral abutments 53. Shoes 17' are each provided with a pair of elongated arms 46, each of which has a T-shaped head 47 at the end thereof and the arms 46 are also provided with lateral abutments 54. The successive arms 46 are offset to clear each other and these arms extend through the rectangular space between connected arms 43 and 44 and each head is arranged to interlock with the head of the alternate arm and with the truss arm 43 or 44. Truss arms 43 are provided with a cut out portion which forms a seat 48 for the head 47 and the arm 44 is similarly cut out on the opposite side to form a similar seat 52. The arms 46 thus interlock with each other and with the truss arms to limit the inward movement of the tread members. As the shoes pass around a wheel the arms 46 move farther into the space between the arms 43 and 44. The arms of successive shoes 16' may thus approach one another until they practically meet without interference with the arms of shoes 17'.

The truss structure described therefore lends itself admirably for use in connection with a running gear for a vehicle in which it is desired to employ wheels of a small diameter which must at the same time be capable of withstanding heavy loads and hard usage.

Having described the nature and embodiments of my invention, what I desire to secure by United States Letters Patent is as follows:

1. A track chain for a vehicle comprising alternate support shoes of different construction, said support shoes having hingedly connected tread members, truss arms extending inwardly from the tread members of alternate shoes provided with transversely spaced bearing members, truss arms extending inwardly from intervening shoes, said last mentioned truss arms each having a cross head provided with longitudinally spaced bearing members, and slotted links pivotally and slidably connecting said transversely spaced bearing members and said longitudinally spaced bearing members.

2. A track chain for a vehicle comprising alternately different shoes having tread members forming an endless chain, truss members extending from alternate tread members and having transversely spaced bearing members, truss members extending from the remaining tread members, each having a cross head provided with longitudinally spaced bearing members, links pivotally attached to the truss members having the transversely spaced bearing members and having slots at their opposite ends for connecting the links to bearing members of the truss members having the longitudinally spaced bearing members.

3. A track chain for a vehicle comprising alternate shoes of different construction having tread members forming an endless chain, a truss member extending inwardly from each of alternate tread members and having a transverse support, a shaft in said transverse support providing transversely spaced journals, a truss member extending inwardly from each of the remaining tread members and having two bearing members in longitudinals alinement, a pair of links pivotally attached to the transversely spaced journals and having slots at the opposite ends for providing a lost motion connection with bearing members of adjacent shoes.

4. A track chain for a vehicle comprising a plurality of shoes having interconnected tread members, alternate tread members being provided with truss members of a different construction, the truss member of one tread member comprising a plurality of truss arms carrying a transverse support, a journal member carried by said support for providing transversely spaced journals, adjacent truss members each having a plurality of truss arms carrying longitudinally spaced bearing members, the bearing members of one of the adjacent truss members being in longitudinal alinement with one of the transversely spaced journals and the bearing members of the other adjacent truss member being in longitudinal alinement with the other of the transversely spaced journals and connected to the alined bearings of the adjacent truss members.

5. A track chain for a vehicle comprising a plurality of shoes having tread members pivotally interconnected at opposite ends to form an endless chain, the alternate tread members each being provided with truss members carrying a bearing centrally above the tread member; the remaining tread members each provided with a truss member carrying a plurality of bearings substantially in vertical alinement with the pivotal points of adjacent tread members and a pair of links attached to the bearing centrally above a tread member, each link being connected to a bearing in substantial vertical alinement with a tread member.

6. A track chain for a vehicle comprising alternate support shoes of different construction having tread members forming an endless chain, a truss member extending inwardly from each alternate tread member having a transverse support, a shaft in said support providing transversely spaced journals, truss members extending inwardly from the remaining tread members, each of said truss members having two bearing members in longitudinal alignment, and interconnecting means including slotted links pivotally and slidably connected to said transversely spaced journals and also to said longitudinally aligned bearing members.

7. A track chain for a vehicle comprising alternately different shoes including tread members pivotally connected to form an endless chain, a pair of truss arms extending inwardly from each alternate tread member, a cross piece bridging the extremities of the arms, a T-shaped truss arm extending inwardly from each of the remaining tread members, and links inter-connecting opposite extremities of said T-shaped arm to said pairs of truss arms on adjoining shoes to support the tread members in the load supporting position, said T-shaped arms being of such a height as to pass between the truss arms and cross pieces of adjacent shoes, thereby rendering the truss arms collapsible on a short radius.

8. A track chain for a vehicle comprising alternately different shoes having tread members pivotally inter-connected to form an endless chain, a pair of truss arms extending inwardly from each alternate tread member, a cross piece bridging said arms, a T-shaped truss arm extending inwardly from each of the remaining tread members, said T-shaped truss members including longitudinally extending arms, said arms being inter-connected with adjacent truss arms of alternate truss members to support the portion of said track chain in the load supporting position.

9. A track chain for a vehicle comprising a plurality of tread members pivotally interconnected to form an endless chain, a truss member extending inward from each alternate tread member having a single transverse bearing across a vertical center of said tread member, a truss member extending inwardly from each of the adjacent tread members having a pair of transverse bearings therein, each bearing positioned vertically above a pivotal connection between the tread members, shafts in all of said bearings, and a pair of links pivotally mounted on each single transverse bearing, one connected to one of said bearings on a tread member on the left side and one connected to one of said bearings on a tread member on the right side.

In witness whereof, I hereunto subscribe my name this 27th day of September, 1928.

ISAAC H. ATHEY.